United States Patent [19]

Duchéne et al.

[11] 4,153,345
[45] May 8, 1979

[54] ELECTROLYTIC DISPLAY DEVICE

[75] Inventors: Jacques Duchéne, Grenoble; Robert Meyer, Gieres, both of France

[73] Assignee: Commissariat a l'Energie Atomique, Paris, France

[21] Appl. No.: 797,261

[22] Filed: May 16, 1977

[30] Foreign Application Priority Data

May 19, 1976 [FR] France ................. 76 15103

[51] Int. Cl.² ................................. G02F 1/17
[52] U.S. Cl. ..................................... 350/363
[58] Field of Search .................. 350/363, 359

[56] References Cited

U.S. PATENT DOCUMENTS 3,153,113 10/1964 Flanagan et al. ............... 350/363
3,995,940 12/1976 Guyon et al. ..................... 350/363

*Primary Examiner*—Stanley D. Miller, Jr.
*Assistant Examiner*—James W. Davie
*Attorney, Agent, or Firm*—Sughrue, Rothwell, Mion, Zinn and Macpeak

[57] ABSTRACT

A cell illuminated by a light source is constituted by an electrolyte containing metallic ions and interposed between a first wall coated with a first transparent conductive film which forms a display electrode and a second wall coated with a second conductive film which forms a counter-electrode. Deposition or dissolution of an absorbent metallic thin film less than 10 nm in thickness is carried out on the display electrode by electrochemical reaction.

6 Claims, 7 Drawing Figures

FIG.5
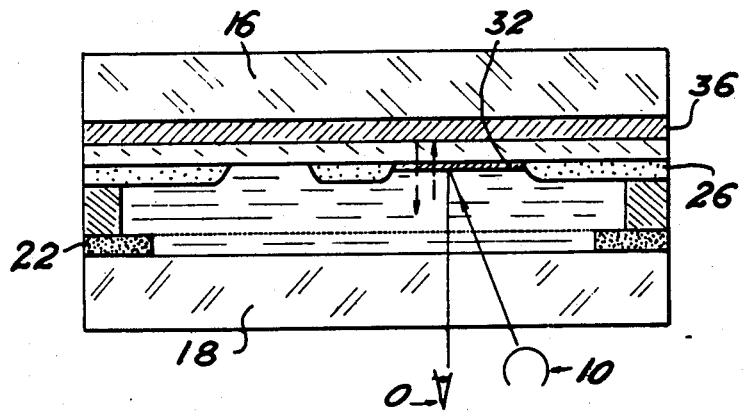
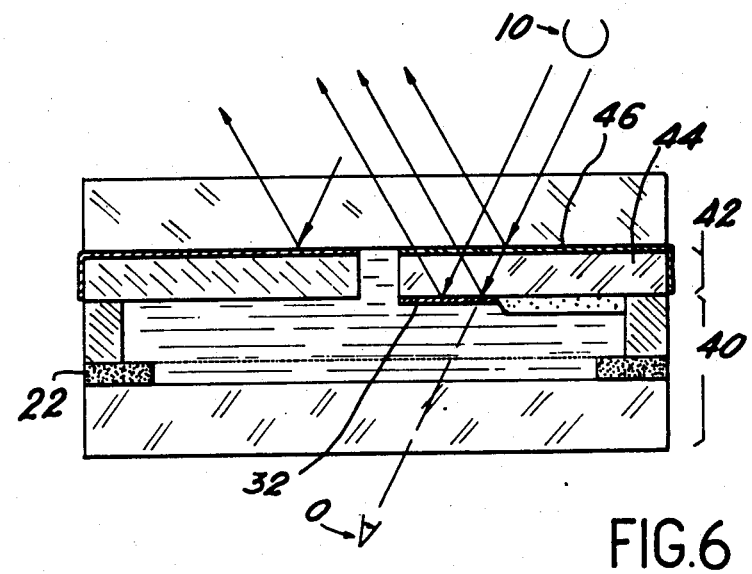
FIG.6

ELECTROLYTIC DISPLAY DEVICE

This invention relates to an electrolytic display device having an absorbent deposit. The device finds an application in optoelectronics and especially in the display of alphanumeric characters.

An electrolytic display device is usually constituted by an electrolyte interposed between two walls covered with electrodes which are connected to electric supply means; deposition or dissolution of a film-layer having optical properties (reflection, absorption) which are capable of forming a sign (character, curve, segment and so forth) is carried out on said electrodes by electrochemical reaction.

In some devices, the film-layer which is deposited by electrochemical reaction is a reflecting metallic film (this is the case in particular with silver films). In devices of other types, this film-layer is organic and absorbent (use being made in particular of viologenic diheptyl). With regard to the devices of the first category in which the reflecting properties of metallic films are utilized, reference can be made in particular to French Pat. No. 1,228,105 applied-for on Feb. 3, 1959, to U.S. Pat. No. 3,245,313 of Apr. 12, 1966 and No. 3,626,410 of Dec. 7, 1971 and to the French patent application No. 2,131,993 filed on Feb. 29, 1972.

The operation of the devices described in these patent specifications is based on the light-reflecting property of an electrodeposited metallic film. This property is well known in the case of films which have a relatively substantial thickness, for example a thickness greater than a few hundred Angströms. In this application to electrolytic display, the quality of a metallic film can be appreciated by a parameter known as the "factor of merit." This is equal to the ratio $d/Q$, where d is the optical density of a film and Q is the electric charge which is necessary in order to deposit said film on a unit area of electrode. It is recalled in this connection that the optical density of a film is equal to the logarithm of the ratio between the intensity of the light which impinges on the film and the intensity of the light transmitted by the film; it follows from this definition that the most advantageous metals for this application are those which exhibit the highest factor of merit.

In order to assess the suitability of a metal for this application, the optical density d exhibited by the metal in films of varying thickness is calculated at the outset from formulae which are standard and utilize the characteristics of the metal in the solid state. It is then found that this density and therefore the factor of merit decreases when the thickness of the film decreases. More precisely and in the case of silver, when the thickness of the film is of the order of 100 nm, the factor of merit as thus calculated is of the order of 30; it drops to 24 for a thickness of 50 nm, then to 10 for a thickness of 10 nm and finally to 6 for a thickness of 5 nm.

These results explain the reason why metallic films are always of substantial thickness in devices of the prior art since, in accordance with a widely prevalent view which is backed up by the foregoing considerations, it is only under these conditions that a surface of sufficient optical density can be obtained.

Researches carried out by the present Applicant have brought to light a surprising phenomenon which runs counter to all previous assumptions made in regard to the behavior of electrodeposited metallic films. This phenomenon is as follows: when the electrodeposited metallic film (especially silver films) has a thickness of less than about 10 nm, the factor of merit $d/Q$ again assumes a much higher value than that which could normally have been expected by applying the calculations adopted up to the present time. More specifically, the inventors have shown that a $d/Q$ ratio of the order of 75 is obtained in the case of a silver film having a thickness of the order of 4 nm, which is a wholly unexpected result (the theoretical calculation mentioned above produces a factor of merit of approximately 6). This sharp increase in the $d/Q$ ratio is due to the appearance of strong light absorption of the metallic film which consequently permits an increase in the optical density d although the reflection remains weak. Furthermore, this increase in the value d is accompanied by a decrease in the value Q since the film to be deposited becomes very thin, with the result that the $d/Q$ ratio reverts to high values. Accordingly, it is not only possible but advantageous to employ thin films of this type for electrolytic display since said films work by light absorption and no longer by light reflection as in the prior art. The device under consideration possesses display properties which are at least as good as those exhibited by devices of the prior art while requiring much lower electric power consumption.

Although the scope of the present invention is not limited in any respect whatsoever to this interpretation, the inventors believe that the unexpected behavior of a metallic thin film having a thickness of less than 10 nm can be explained by a phenomenon of "abnormal absorption" which does in fact appear in certain very thin metallic films formed by vacuum deposition. However, this interpretation is given solely by way of explanation since it is not certain that the structure of a film formed by a reversible process of electrodeposition is identical with the structure of a film formed by vacuum deposition.

Stated in exact terms, the present invention is therefore concerned with an electrolytic display device of the type comprising a light source for illuminating a cell constituted by an electrolyte containing metallic ions interposed between a first wall coated with a first transparent conductive film-layer forming an electrode and having a shape adapted to display, and a second wall coated with a second conductive film-layer forming a counter-electrode, and by means for supplying electric current to said electrodes in order to induce deposition or dissolution of a metallic film-layer on said electrode by electrochemical reaction from said ions. The device in accordance with the invention is distinguished by the fact that said metallic film-layer is a light absorbent thin film having a thickness of less than approximately 10 nm.

Preferably, the thin film employed is of silver.

Depending on whether the display device, itself, operates in reflection or in transmission, many alternative structural forms can be contemplated. The essential feature of these structures always lies in the presence of the light-absorbent metallic thin film.

In accordance with a preferential alternative embodiment, the electrolytic cell is of the type consisting of an interferential filter as described in French patent application No. En 74 08377 filed by the present Applicant on Mar. 12, 1974 in respect of a "Luminous display device", and corresponding to U.S. Pat. No. 3,995,940. In this alternative embodiment, the device in accordance with the present invention is distinguished by the fact that provision is made in the first wall for an interferential filter constituted by a film-layer of transparent material and of constant optical thickness which is interposed between a semi-reflecting film and said absorbent metallic thin film.

The distinctive features and advantages of the present invention will in any case become more readily apparent from the following description of examples of construction which are given by way of explanation without any limitation being implied, reference being made to the accompanying drawings, wherein:

FIG. 5 illustrates another alternative embodiment of the device which operates in reflection with observation through the electrolyte;

FIG. 6 illustrates an embodiment of the device in accordance with the invention which utilizes a structure of the interferential filter type;

Figure 1:
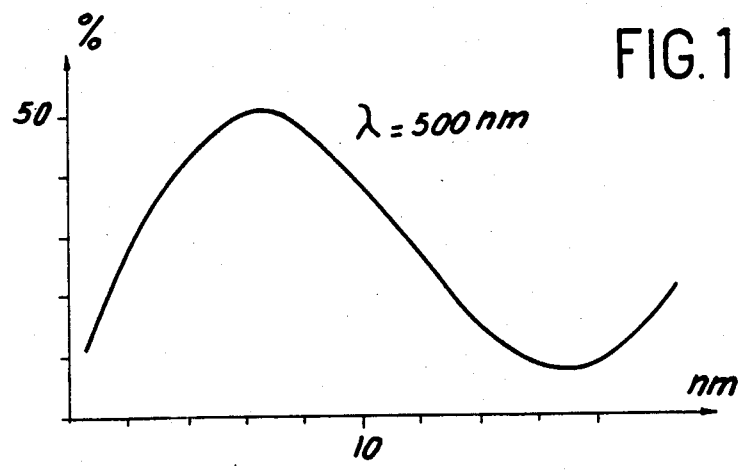
FIG. 1 shows the variation in absorption of a silver film deposited reversibly by the electrolytic process as a function of the thickness of said film.
Figure 2:
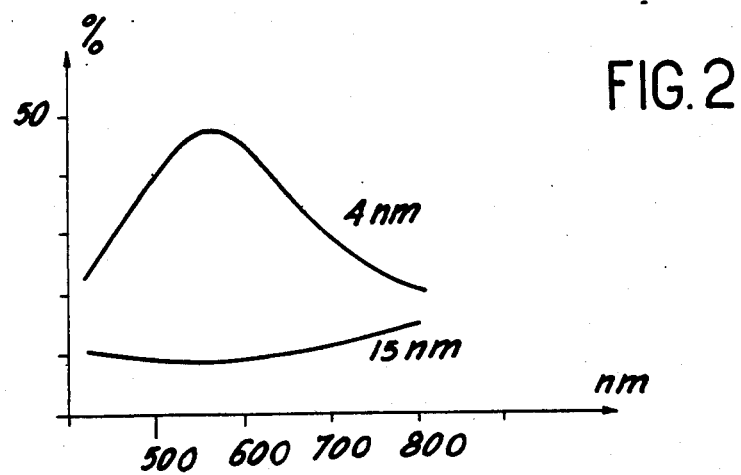
FIG. 2 shows the absorption of a silver film having a thickness of 4 nm and 15 nm as a function of the wavelength.

The experimental results obtained by the present Applicant in the light absorption of thin films of silver are illustrated in FIGS. 1 and 2.

First of all, FIG. 1 shows the variations in said absorption as expressed in percentages and plotted as ordinates as a function of the thickness of the film which is plotted as abscissae and expressed in nanometers in the case in which the measurement light radiation has a wavelength of 500 nm. In the case of a thickness of a few tens of nanometers, the absorption of the silver film decreases with the thickness, which corresponds to the right-hand portion of the curve. In the vicinity of 10-12 nm, the absorption increases to a surprising extent and attains practically 50% in the vicinity of 6 nm. This "abnormal absorption" phenomenon, so unexpected in metallic thin films formed reversibly by electrodeposition, is employed in the device according to the invention.

FIG. 2 further illustrates the absorption of a silver film but as a function of the wavelength of the incident radiation expressed in nanometers, the thickness of the film being constant (4 nm and 15 nm). In accordance with the results shown in FIG. 1, it is apparent that the absorption is much stronger in the case of a film having a thickness of 4 nm than in the case of a film having a thickness of 15 nm.

The device in accordance with the present invention can assume many different forms, depending on whether it is employed in transmission or in reflection. Some of these alternative forms of construction are illustrated diagrammatically in FIGS. 3, 4 and 5.

Figure 3:
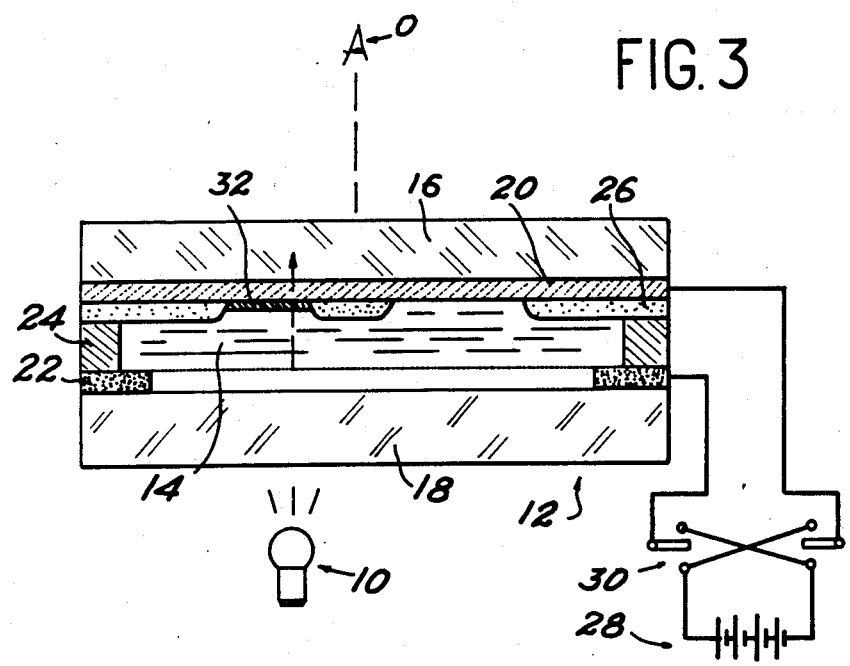
FIG. 3 is a sectional view of a first form of construction of the device in accordance with the invention which operates in transmission.

In FIG. 3, the device is shown in cross-section and comprises: a light source 10 which illuminates a cell 12 constituted by an electrolyte 14 interposed between two walls 16 and 18 coated with conductive deposits 20 and 22 respectively; the film deposit 20 forms an electrode and has a structure which is suited to display (matrix of points, segments and so forth); the film 22 constitutes a counter-electrode; in the alternative form which is illustrated, said film 22 is designed in the form of a ring but could have a different shape on condition that it always remains in contact with the electrolyte. Spacer elements 24 serve to give a suitable thickness to the electrolyte; an insulator 26 is placed between the spacer element and the conductive film 20. The electrodes 20 and 22 are connected to a voltage source 28 by means of a switch 30. Depending on the position of said switch, it is thus possible to apply between the electrodes a continuous potential difference in one direction or in the other. A light absorbent metallic thin film 32 which characterizes the invention undergoes deposition or dissolution (depending on the polarity of the electrode 20) by means of the electrolyte 14 as a result of electrochemical oxidation-reduction reactions.

Figure 4:
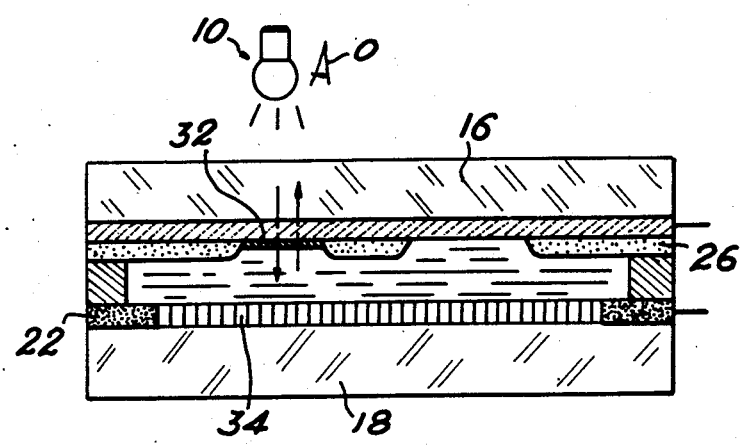
FIG. 4 is a sectional view of a second alternative embodiment of the device in accordance with the invention which operates in reflection.

The device shown in FIG. 4 differs from the preceding only in the presence of a reflecting or scattering film-layer 34 on the wall 18. In this case, the device operates in reflection and the light source 10 is placed on the same side of the cell as the eye 0 of the observer. This arrangement is advantageous since the light perceived by the observer has passed twice through the absorbent thin film 32, thus enhancing the effect of absorption introduced by said film.

In FIG. 4, the reflecting film 34 is separate from the counter-electrode 22 but could of course coincide with the counter-electrode if this latter were to extend over the entire surface of the wall 18.

As a secondary consideration, the film 34 can be colored in order to introduce a selective attenuation of light. In this case the light is initially absorbed in the silver film 32, then reflected selectively from the film 34 and again absorbed by the silver film 32. For example, if the metallic film absorbs the blue-green portion of the visible spectrum (which is the case in particular of silver films having a thickness of 4 nm as can be ascertained by referring to FIG. 2), a reflecting background which is also blue-green eliminates the yellow-red portion of the light which has passed through the silver film and the electrolyte, thus increasing the absorption to an even greater extent. The characters displayed will then have a black appearance on a blue-green reflecting background.

In another alternative embodiment which is illustrated in FIG. 5, observation again takes place by reflection but through the electrolyte. In this case, the first wall 16 has a reflecting layer 36 and the observer 0 stands on the same side of the cell as the light source 10. In this case the electrolyte masks the rear portion of the device and the light is absorbed in the round-trip traversals.

It is readily apparent that different arrangements could be devised by those versed in the art without thereby departing from the scope of the present invention and by combining the three embodiments which have just been described with reference to FIGS. 3, 4 and 5.

Figure 7:
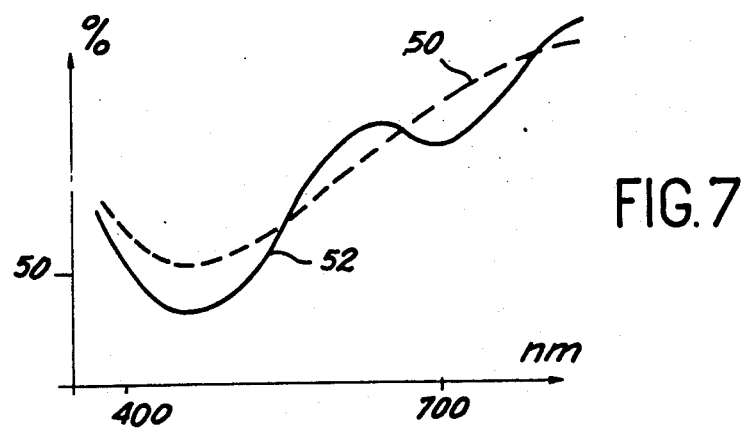
FIG. 7 shows the variations in light intensity transmitted through the device of FIG. 6 as a function of the wavelength.

In another embodiment, the device in accordance with this invention combines the abnormal absorption effects exhibited by the metallic thin film with those of an interferential filter as described in the French patent application (corresponding to U.S. Pat. No. 3,995,940) cited earlier and filed by the present Applicant. This alternative embodiment is illustrated diagrammatically in FIG. 6. In this figure, a cell 40 which is identical with the cell shown in FIG. 3 is associated with an interferential filter 42 constituted by a film 44 of transparent material having a constant optical thickness, said film being interposed between a semi-reflecting film 46 and the film 32 which is the characteristic absorbent metallic thin film in accordance with the invention. This device is illuminated by the light source 10 and the observer 0 receives the light transmitted. The transmitted light intensity is equal to the incident intensity from which is deducted that portion of the light which is reflected by the interferential filter 42 and that portion of the light which is absorbed in the film 32. The combination of the two effects of interference and absorption therefore improves the display contrast as can be appreciated from a study of FIG. 7.

This figure is a diagram representing the variations in the intensity transmitted by the device of FIG. 6 as a function of the wavelength in two cases: in the case of a display device of the interferential type as described in the patent Application cited earlier (as represented by the curve 50) and in the case of the device of FIG. 6 which shows the combination of the two devices (as represented by the curve 52). It can be seen from FIG. 7 that, in the blue-green region of the spectrum, a better contrast is obtained by employing the combination of the two devices since the transmitted intensity is reduced, which corresponds to an increase in optical density in the displayed zone.

The materials which are suitable for the fabrication of devices of the type described in the foregoing are well known in this type of technique and fully described in the prior art mentioned earlier. By way of explanation, the electrolyte can be in liquid form but must essentially contain the ions of the metal which it is desired to deposit in a thin film. The walls can be glass plates, the film 20 can consist of a layer of transparent conductive oxide ($In_2O_3$ or $SnO_2$) and the spacer elements can be of mylar; the counter-electrode is usually formed by a thin sheet or film of the same metal as the film 32.

The metals which can be employed for the purpose of forming the absorbent thin film 32 are preferentially those in which the oxidation-reduction potential of the metal/metallic ion pair is higher than the reduction potential of the oxide which constitutes the electrode 20 in order to ensure that this latter cannot be reduced during the metal deposition stage. Silver is one example of metal which is particularly well suited to the formation of said absorbent thin film.

In all the alternative embodiments herein described as in the known electrolytic devices, symmetrical electrochemical reactions are carried out on both electrodes 20 and 22. During the stage of deposition of the absorbent thin film 32, the following reaction takes place on the electrode 20:

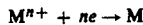

where M designates the metal having a valence of n and the following reaction takes place on the electrode 22:

During the dissolution stage, these reactions are reversed. This system makes it possible to maintain a constant composition of the electrolyte during operation of the cell and to minimize the control voltage.

When in liquid form, the electrolyte can consist of an aqueous or organic solvent in which one or a number of compounds of the metal M corresponding to the absorbent thin film 32 are dissolved. If so required, other substances can be dissolved in the electrolyte in order to increase the solubility of the metallic ions by complexing them, for example.

In the event that the metal is silver, two non-limitative examples of electrolyte can be given as follows:

Example 1

Solvent: methyl alcohol
Silver salt: $AgNO_3$
Other salt: NaSCN

Example 2

Solvent: methyl alcohol
Silver salt: AgSCN
Other salt: NaSCN

It can readily be understood that the device which has just been described in different alternative embodiments of the invention is endowed not only with inherent properties of good contrast and low electric power consumption but also with properties which characterize any electrolytic display device and especially that of internal memory since dissolution of the metallic deposit is obtained only after application of a voltage of suitable polarity.

What we claim is:

1. In an electrolytic display device of the type comprising a light source for illuminating a cell formed: by an electrolyte containing metallic ions interposed between a first wall coated with a first transparent conductive film-layer forming an electrode having a suitable shape for display and a second wall coated with a second conductive film-layer forming a counter-electrode, and by means for supplying electric current to said electrodes in order to induce deposition or dissolution of a deposited metallic film-layer on said electrode by electrochemical reaction from said ions; the improvement wherein said deposited metallic film-layer is an illuminating light-absorbent thin film having a thickness of less than approximately 10 nm.

2. The improvement according to claim 1, wherein said metallic film-layer is silver.

3. The improvement according to claim 1, wherein the cell walls are transparent and the device accordingly operates in transmission.

4. The improvement according to claim 1, wherein one of the cell walls is coated with a reflecting or scattering film and the device accordingly operates in reflection.

5. The improvement according to claim 2, wherein the cell walls are transparent and the device accordingly operates in transmission.

6. The improvement according to claim 2, wherein one of the cell walls is coated with a reflecting or scattering film and the device accordingly operates in reflection.

* * * * *